Jan. 10, 1967 J. R. MILES 3,296,923
LENTICULATED COLLIMATING CONDENSING SYSTEM
Filed Jan. 4, 1965
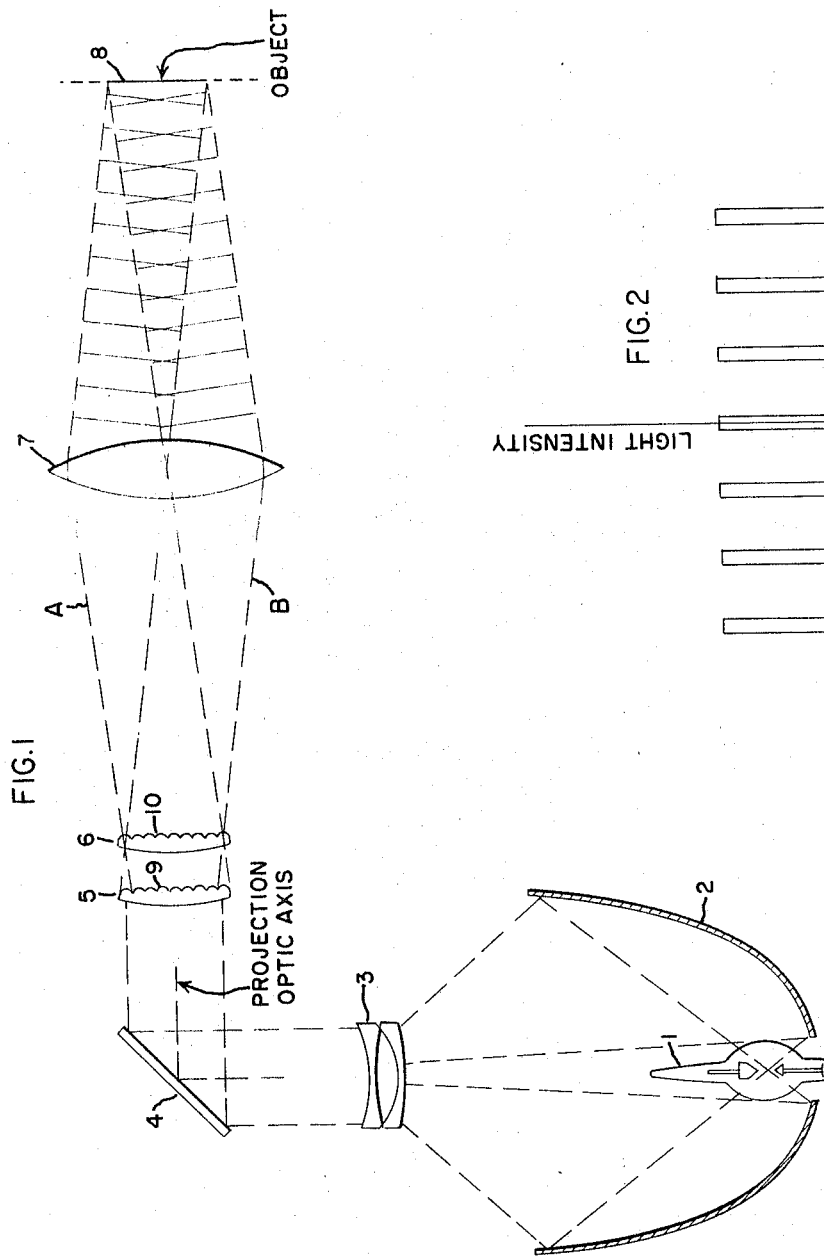
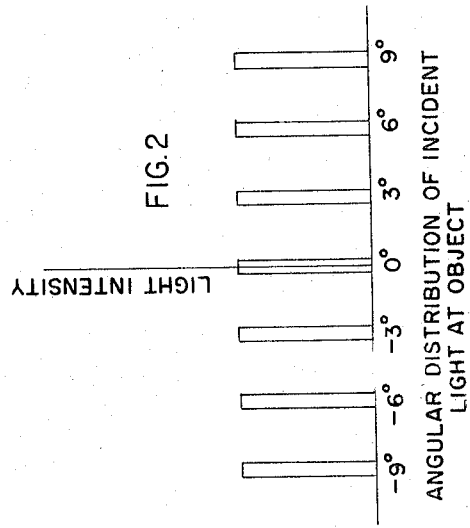
INVENTOR:
JOHN R. MILES,
BY *Marvin L. Goldenberg*
HIS ATTORNEY.

United States Patent Office

3,296,923
Patented Jan. 10, 1967

3,296,923
LENTICULATED COLLIMATING CONDENSING SYSTEM
John R. Miles, Glenview, Ill., assignor to General Electric Company, a corporation of New York
Filed Jan. 4, 1965, Ser. No. 422,908
5 Claims. (Cl. 88—24)

The invention relates to light condensing systems as they apply to light projection systems, and more particularly to an improved lenticulated condensing system which provides an illumination of uniform intensity with a restricted and uniform angular spread of the light rays incident upon the object to be projected.

Light sources commonly employed in light projection systems and, in particular, high energy sources used for high brightness projections, exhibit nonuniform light emission properties due to their construction and radiation characteristics. A uniform illumination of the projection object by nonuniformly emissive light sources has been commonly provided by a condensing system of the type which employs a pair of lenticular lens plates axially spaced between the light source and the object plane. The lenticular plates each comprise an arrangement of closely spaced, small individual lens elements. For every lens element of the first lenticular plate closer to the light source there is a corresponding lens element in the second lenticular plate. The lenticular plates are positioned relative to each other and to the object plane so that the centers of corresponding lens elements of the first and second lenticular plates are on lines that pass through the center of the object plane. The elements of the first plate converge light from the source into crossovers at the apertures of the corresponding second plate elements, the latter elements forming superimposed images of the first plate elements on the object. In this manner, there is accomplished a uniform intensity illumination of the object. A further description of a lenticulated condensing system of the type above described may be found in U.S. Patent No. 2,186,123, issued January 9, 1940 to K. Räntsch et al.

In the above described condensing system, the object illumination, although uniform in intensity, is not uniform in the angular spread of incident light. For light projection systems wherein the light modulation is a function of the angle of incidence of light upon the object, the referred to angle nonuniformity results in a nonuniform and restricted brightness of the display, so that the prior art condensing system is unsatisfactory for use. One such light projection system is described in a copending application for U.S. Letters Patent, Serial No. 222,844, filed September 11, 1962, by Milton L. Noble, entitled "Total Internal Reflection Projection System," and assigned to the assignee of the present invention.

It is accordingly an object of the present invention to provide for use with light projection systems wherein the light modulation is a function of the incident angle of light upon the object to be projected, an improved lenticulated condensing system of the type employing a pair of lenticular lens plates which provides an illumination of the projected object that is uniform in intensity and of uniform angular spread.

It is a further object of the invention to provide an improved condensing system of the type above described wherein the light rays incident on the object plane are also of a restricted angular spread.

It is still another object of the present invention to provide a lenticulated condensing system of the above described type that is relatively simple and inexpensive in its construction and arrangement.

In accordance with the invention there is provided a lenticulated collimating condensing system which includes first and second axially spaced lenticular lens plates arranged in the order recited between the system's light source and the object to be projected, in combination with a large aperture converging lens disposed between the second lenticular lens plate and the object. The lens elements of the first lenticular plate converges the light directed thereto from the light source into crossovers at the apertures of corresponding lens elements of the second lenticular plate. The lens elements of the second lenticular plate produce an array of diverging light beams each striking a different portion of the converging lens. The converging lens collimates each of the beams along converging principal axes so as to superimpose said beams onto the objects, the light rays being thereby incident upon the object plane with a restricted and uniform angular spread.

While the specification concludes with claims particularly pointing out and distinctly claiming the invention, it is believed that the invention will be better understood from the following description taken in connection with the accompanying drawings in which:

FIGURE 1 is a schematic illustration in plan view of a lenticulated collimating condensing system in accordance with the invention; and FIGURE 2 is a graph illustrating the angular spread of the light bundles incident on the object.

With reference to FIGURE 1, there is schematically illustrated, in plan view, a lenticulated collimating condensing system for use in light projection systems employing light sources of nonuniform intensity illumination properties, thus having greatest application to high brightness projection systems. The condensing system provides both a uniform intensity illumination of the object to be projected and a uniform and restricted angular spread of the light incident upon the object. The system basically includes a source 1 of high brightness energy, an elliptical reflector element 2 positioned rearward of the source 1 for giving direction to the generated light energy, a conventional collimating lens means 3, a cold mirror 4, a first lenticular lens plate 5, a second lenticular lens plate 6, a large aperture converging lens 7 and the object 8.

The light source 1 may be composed of any one of a number of conventional luminous devices used in projection apparatus. In one operating embodiment a 2,000 watt xenon arc lamp was employed. The elliptical reflector 2 is a conventional optical component for directing the light emitted from said source into the collimating lens means 3. Collimating means 3 may comprise typically a pair of negative combination collimating lenses which receive light from over a wide angle and transform it into a collimated beam along the projection optic axis. The collimated light is intercepted by the cold mirror 4 which extracts a large measure of infrared energy from the light by transmitting the infrared wavelengths and reflecting the visible wavelengths. The reflected light beam is rotated by 90° from its original course and directed toward the lenticular lens plates 5 and 6. Since the emission from the source 1 is characteristically of uneven intensity, e.g., due to the lamp's electrode structure which blocks light energy from the central region of the light beam, and also the nonuniform radiation pattern of the emitted energy, the collimated beam thus far formed is of uneven intensity throughout its cross-section.

The first lenticular lens plate 5 includes at its output surface an array of abutting individual lens elements 9 each of which is a small spherical lens having an aperture corresponding to the shape of the object, typically rectangular. The second lenticular lens plate 6 includes at its output surface a similar array of comparably shaped individual lens elements 10, for every lens element 9 there being a corresponding lens element 10.

The lenticular plates 5 and 6 are spaced apart by approximately the focal length of the lens elements 9 so that the light energy transmitted through each of the elements 9 converges and forms a crossover at approximately the center of the entrance to the corresponding elements 10. In this manner light is efficiently transmitted from the first lenticular plate 5 to the second lenticular plate 6. The lens elements 10 of the second lenticular plate 6 each produce a diverging light beam, which beams are intercepted by different portions of the converging lens 7. Only the two outermost diverging light beams are illustrated. The input surfaces of the lenticular lens plates 5 and 6 can be slightly convex, as shown, which has a converging effect on the propagated light, thereby allowing the employment of a smaller aperture lens 7 than would be otherwise required. For such configuration the lens elements 10 are proportionately slightly smaller than the lens elements 9.

The lens 7 is positioned from the lenticular plate 6 at a distance approximately equal to its focal length so that the received diverging light beams, each having crossovers approximately in the plane of the lenticular plate 6 become collimated. However, since the individual diverging light beams are incident upon different portions of the lens 7 of dissimilar curvature, light beams exiting from the lens 7 are collimated along converging principal axes. The object 8 is positioned in a plane in which the various collimated beams are superimposed. This condition is diagrammatically illustrated in FIGURE 1 wherein the upper diverging beam A is transposed into a downwardly directed collimated beam and the lower diverging light beam B is transposed into an upwardly directed collimated light beam. The beams A and B establish the limiting angles of incident light upon the object 8. It may be appreciated that light beams from the intermediate lens elements 10, which beams are not shown, pass through intermediate portions of the lens 7 and are incident upon the object 8 at successively smaller angles, between the limits of beams A and B, as a function of the distance of their crossover points from the projection optic axis.

Angular characteristics of the light energy incident upon the object in one exemplary embodiment of the invention are graphically illustrated in FIGURE 2. Each column of the graph corresponds to the light energy in a single light beam emanating from a single lens element 10. In the example under consideration it is assumed that lens elements 9 and 10 are arranged in a row-column configuration, there being seven of each. The column of the graph centered on 0° corresponds to the light beam from the lens element on the principal projection axis. The columns at 9° and —9° correspond to the beams from the outermost lens elements, such as beams A and B, respectively, and the remaining columns correspond to the beams of intermediate lens elements. The column widths are a measure of the off-collimation characteristics of the beams.

From the FIGURE 2 and from the geometry of the incident light rays shown in FIGURE 1 it is seen that the incident light at the peripheral region of the object 8, as well as over the entire object surface, is necessarily of uniform angular spread. It may be appreciated that the angular spread can be further restricted by various techniques which now become obvious, such as employing a weaker lens 7.

The appended claims are intended to include within their meaning all modifications and changes of the described specific exemplary embodiment of the invention which fall within the true scope and spirit thereof.

What I claim as new and desire to secure by Letters Patent of the United States is:

1. A light condensing system for uniformly illuminating a projection object comprising:
   (a) a light source providing substantially collimated light energy,
   (b) a first lenticular lens plate having a first multiplicity of lens elements,
   (c) a second lenticular lens plate having a second multiplicity of lens elements corresponding to said first multiplicity, said lenticular lens plates being spaced apart and coaxially arranged so as to intercept light energy emitted from said source and produce an array of diverging light beams, one beam for each pair of corresponding lens elements, and
   (d) lens means disposed between said lenticular lens plates and said projection object for collimating said light beams along converging principal axes so as to superimpose said light beams onto said object, thereby providing a uniform intensity, uniform angular spread illumination of said object.

2. A light condensing system as in claim 1 wherein said first and second lenticular lens plates are spaced apart by a distance approximately equal to the focal length of the lens elements of said first multiplicity so as to image the aperture of the lens element of said first multiplicity into the apertures of corresponding lens elements of said second multiplicity.

3. A light condensing system as in claim 2 wherein said lens means is a large aperture converging lens spaced apart from said second lenticular lens plate by a distance approximately equal to the focal length of said converging lens.

4. A light condensing system for uniformly illuminating a projection object comprising:
   (a) a light source providing substantially collimated light energy,
   (b) a first lenticular lens plate including at the output surface thereof a first multiplicity of lens elements each having an aperture shape related to the object shape,
   (c) means for directing light energy from said source to the input surface of said lenticular lens plate,
   (d) a second lenticular lens plate including at the output surface thereof a second multiplicity of lens elements corresponding to said first multiplicity, said first and second lenticular lens plates being coaxially arranged and spaced apart by a distance approximately equal to the focal length of said first multiplicity so that light received by said first lenticular lens plate is focused into crossovers at the apertures of corresponding lens elements of said second multiplicity, the second multiplicity of lens elements thereby producing an array of diverging light beams, one beam for each pair of corresponding lens elements, and
   (e) a large aperture converging lens disposed between said second lenticular lens plate and said projection object at a distance from said second lenticular lens plate approximately equal to the focal length of said converging lens, said converging lens receiving said diverging light beams at different portions of its input surface and collimating said light beams along converging principal axes so as to superimpose the collimated light beams onto said object, whereby a uniform intensity, uniform angular spread illumination of said object is provided.

5. A light condensing system as in claim 4 wherein the input surfaces of said first and second lenticular lens plates are slightly convex.

References Cited by the Examiner

UNITED STATES PATENTS

| | | | |
|---|---|---|---|
| 2,183,249 | 12/1939 | Schering et al. | 88—24 |
| 2,186,123 | 1/1940 | Rantsch et al. | 88—24 |
| 2,326,970 | 8/1943 | Rantsch | 88—24 |
| 2,803,163 | 8/1957 | Ulffers | 88—24 |
| 2,991,691 | 7/1961 | Schering | 352—198 |

FOREIGN PATENTS

| | | |
|---|---|---|
| 741,246 | 11/1955 | Great Britain. |
| 818,229 | 8/1959 | Great Britain. |

JOHN M. HORAN, *Primary Examiner.*

NORTON ANSHER, *Examiner.*

H. H. FLANDERS, *Assistant Examiner.*